US012108858B2

(12) United States Patent
Akerele et al.

(10) Patent No.: US 12,108,858 B2
(45) Date of Patent: Oct. 8, 2024

(54) HAIR VOLUMIZING TREATMENTS WITH IN SITU DIAGNOSTIC ASSESSMENT AND FORMULA DISPENSING

(71) Applicant: L'Oreal, Paris (FR)

(72) Inventors: Dominic Akerele, Brooklyn, NY (US); Fred Orsita, New York, NY (US); Richard Besen, New York, NY (US); Guive Balooch, New York, NY (US)

(73) Assignee: L'Oreal, Paris (FR)

( * ) Notice: Subject to any disclaimer, the term of this patent is extended or adjusted under 35 U.S.C. 154(b) by 465 days.

(21) Appl. No.: 17/491,025

(22) Filed: Sep. 30, 2021

(65) Prior Publication Data

US 2023/0101556 A1 Mar. 30, 2023

(51) Int. Cl.
| | | |
|---|---|---|
| *A45D 24/22* | (2006.01) | |
| *A45D 24/00* | (2006.01) | |
| *A46B 15/00* | (2006.01) | |
| *G06T 7/00* | (2017.01) | |
| *G06T 7/12* | (2017.01) | |

(52) U.S. Cl.
CPC ........... *A45D 24/22* (2013.01); *A45D 24/007* (2013.01); *A46B 15/0004* (2013.01); *A46B 15/0034* (2013.01); *G06T 7/0014* (2013.01); *G06T 7/12* (2017.01); *G06T 2207/30004* (2013.01)

(58) Field of Classification Search
CPC ............ A46B 15/0034; A46B 15/0004; A46B 15/0002; A46B 11/0006; A46B 11/001; A46B 11/0062; A45D 24/22; A45D 24/007; A45D 24/00; G06T 7/12; G06T 7/0014

USPC ................. 401/268, 270, 286; 132/111–114
See application file for complete search history.

(56) References Cited

U.S. PATENT DOCUMENTS

| | | | |
|---|---|---|---|
| 10,413,181 B2 * | 9/2019 | Yang ................... | A46B 15/0022 |
| 2010/0139682 A1 | 7/2010 | Edgar et al. | |
| 2015/0164213 A1 | 6/2015 | Hyde et al. | |
| 2015/0342515 A1 * | 12/2015 | Hutchings .......... | A46B 15/0038 132/148 |

(Continued)

FOREIGN PATENT DOCUMENTS

| | | |
|---|---|---|
| EP | 1092361 A1 | 4/2001 |
| FR | 3020465 A1 | 10/2015 |

(Continued)

OTHER PUBLICATIONS

International Search Report and Written Opinion, issued Jan. 24, 2023, in corresponding International Patent Application No. PCT/US2022/077296, 38 pages.

*Primary Examiner* — David J Walczak
(74) *Attorney, Agent, or Firm* — Christensen O'Connor Johnson Kindness PLLC

(57) ABSTRACT

A diagnostic formula applicator can include a fluid dispensing assembly coupled with a comb having a plurality of tines. A tine of the plurality of tines can be configured to dispense a fluid formula to a region of a biological surface via at least one fluid conduit. The diagnostic formula applicator can include hair diagnostic circuitry operably coupled to the fluid dispensing assembly. The diagnostic circuitry can be configured to actuate the fluid dispensing assembly to deliver the fluid formula via the at least one fluid conduit, responsive to determining a user-specific hair cosmetic aspect from hair and scalp sensor information.

18 Claims, 6 Drawing Sheets

(56) References Cited

U.S. PATENT DOCUMENTS

2019/0209077 A1  7/2019  Charraud et al.
2020/0151948 A1  5/2020  Mehedy et al.

FOREIGN PATENT DOCUMENTS

KR   20200110871 A   9/2020
WO    2016127272 A1  8/2016

* cited by examiner

HAIR VOLUMIZING TREATMENTS WITH IN SITU DIAGNOSTIC ASSESSMENT AND FORMULA DISPENSING

SUMMARY

Systems, devices, and methods for in situ diagnostic assessment and formula dispensing are described. A diagnostic formula applicator can include a fluid dispensing assembly coupled with a comb having a plurality of tines. A tine of the plurality of tines can be configured to dispense a fluid formula to a region of a biological surface via at least one fluid conduit. The diagnostic formula applicator can include hair diagnostic circuitry operably coupled to the fluid dispensing assembly. The diagnostic circuitry can be configured to actuate the fluid dispensing assembly to deliver the fluid formula via the at least one fluid conduit, responsive to determining a user-specific hair cosmetic aspect from hair and scalp sensor information.

In some embodiments, the hair diagnostic circuitry is configured to actuate the fluid dispensing assembly to deliver the fluid formula responsive to a determination that the user-specific hair cosmetic aspect satisfies (meets or exceeds) a threshold hair volume, a threshold hair thickness, a threshold hair follicle density, or a threshold hair temperature. The hair diagnostic circuitry can be configured to actuate the fluid dispensing assembly to deliver the fluid formula responsive to a determination that the user-specific hair cosmetic aspect satisfies a user-specific hair volume, a user-specific hair thickness, a user-specific hair follicle density, or a user-specific hair temperature. The hair diagnostic circuitry can be configured to actuate the fluid dispensing assembly to deliver the fluid formula responsive to a determination that the user-specific hair cosmetic aspect differs from a reference combability measure, a reference damage measure, a reference elasticity measure, a reference frizziness measure, a reference malleability measure, a reference static charge measure, a reference retention of styling measure, a reference smoothness measure, a reference softness measure, or a reference stiffness measure. The hair diagnostic circuitry can be configured to actuate the fluid dispensing assembly to deliver the fluid formula responsive to a determination that the user-specific hair cosmetic aspect meets or exceeds a threshold shape, a threshold shine, a threshold texture, or a threshold volume. The hair and scalp sensor information can be or include images of the region of the biological surface.

In some embodiments, the comb further includes a contact sensor in electronic communication with the hair diagnostic circuitry, the sensor configured to detect a physical contact between the tine and the biological surface. The tine can be a first tine, the conduit can be a first conduit, and a second tine of the plurality of tines can include a second conduit fluidly coupled with the fluid dispensing assembly. The diagnostic formula applicator can further include a radiation source, electronically coupled with the hair diagnostic circuitry. The radiation source can include a source of polarized radiation.

In some embodiments, the fluid dispensing assembly includes a port configured to removeably couple with a fluid reservoir. The fluid reservoir can include a compartment containing a topical antihypertensive vasodilator. The fluid reservoir can include a compartment containing a topical antipruritic. The fluid reservoir can include a compartment containing a cosmetic formula.

In some embodiments, the hair diagnostic circuitry is operably coupled with a radiation sensor. The radiation sensor can be or include a polarized-light camera or an infrared camera. The diagnostic formula applicator can further include one or more non-transitory memory devices storing computer-readable instructions that, when executed by the hair diagnostic circuitry, cause the hair diagnostic circuitry to perform operations. The operations can include generating an image of a region of a biological surface using the radiation sensor, the region comprising skin, hairs, and hair follicles. The operations can include attributing the user-specific hair cosmetic aspects to the region of the biological surface using the image. The operations can also include dispensing the fluid formula to the region via the conduit using the fluid dispensing assembly, based at least in part on the one or more cosmetic aspects.

In some embodiments, attributing the user-specific hair cosmetic aspect to the region of the biological surface includes detecting one or more edges in the image, the edges defining the hairs and the hair follicles. Attributing the user-specific hair cosmetic aspect to the region of the biological surface can include estimating a characteristic width of the hairs in the image using the edges, estimating a number of hair follicles in the region using the edges, determining a size of the region using the image, determining a hair volume using the number of hair follicles and the size, or determining a hair thickness using the characteristic width. Dispensing the fluid formula can include receiving a signal from a contact sensor, electronically coupled with the hair diagnostic circuitry, the signal indicating a physical contact between the tine and the biological surface. Dispensing the fluid formula can also include actuating an electronically actuated valve, electronically coupled with the hair diagnostic circuitry, the valve controlling a flow of the fluid formula from the fluid dispensing assembly to the conduit.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Figure 1:
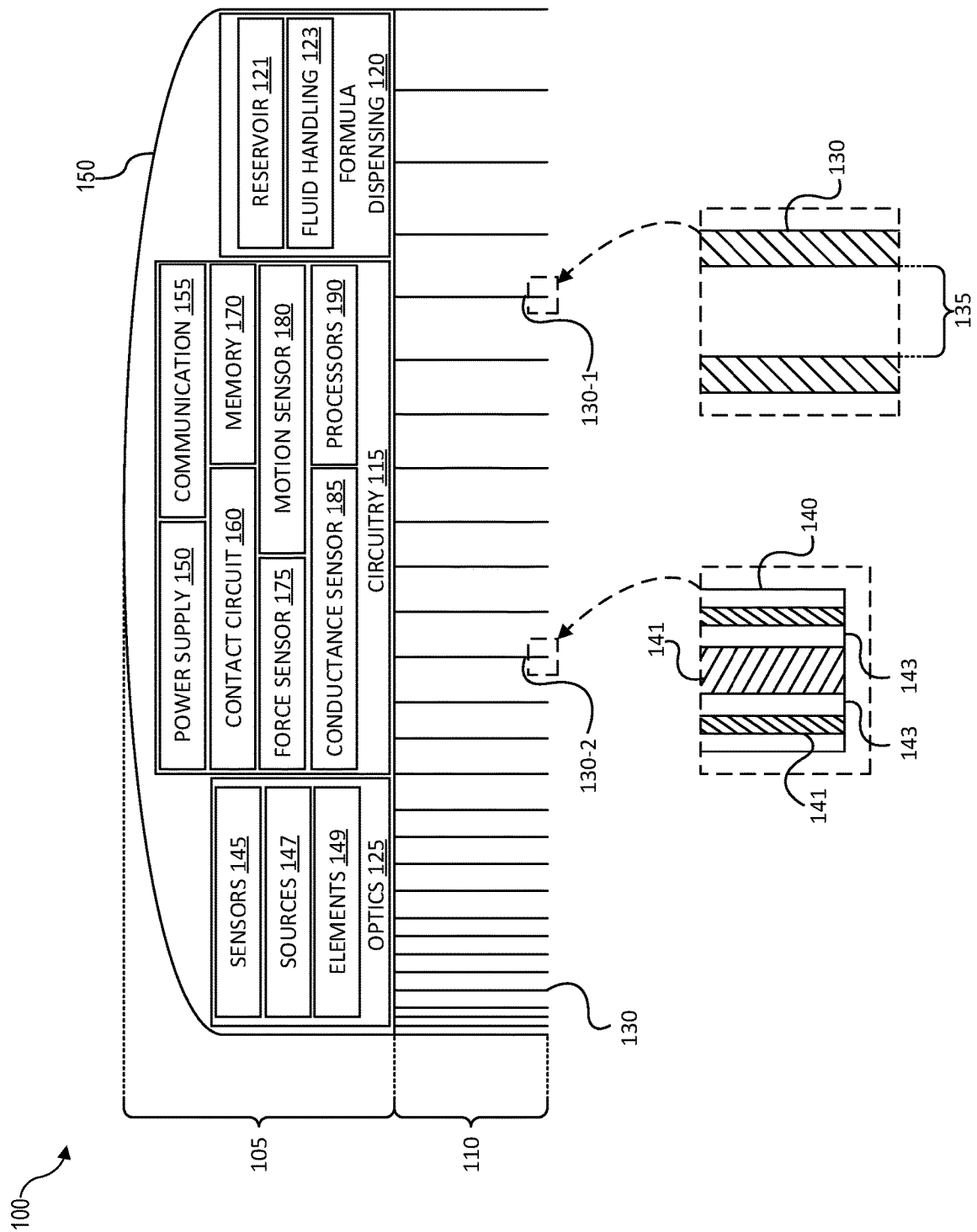
FIG. 1 is a schematic drawing illustrating an example diagnostic formula applicator, in accordance with some embodiments of the present disclosure.

The foregoing aspects and many of the attendant advantages of this invention will become more readily appreciated as the same become better understood by reference to the following detailed description, when taken in conjunction with the accompanying drawings. Non-limiting and nonexhaustive embodiments of the invention are described with reference to the figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Systems, devices, and methods for in situ diagnostic assessment and formula dispensing are described. In general, techniques focus on implementation of computer vision and fluid handling/dispensing in the context of determining one or more user specific cosmetic aspects of a biological surface including skin and hair. In particular, techniques focus on automated (e.g., without human involvement) detection and recognition of hair and skin condition and dispensing of fluidic formulations corresponding to the determination. While the focus is on hair and skin, it is understood that the techniques described herein are similarly suitable for biological surfaces that present edges, features, and other regions that can be detected and recognized using one or more electromagnetic radiation sensors.

Cosmetic aspects of hair and skin are typically treated by a skilled cosmetologist through manual inspection and/or visual assessment of hair shafts, follicles, and scalp. In this context, the term "cosmetic aspects" describes aspects of hair and skin that can be used to determine qualitative and/or quantitative indicators of health and condition of the scalp. Cosmetic aspects can include, among other things, hair width, follicle density, hair density, hair volume, scalp irritation, dry skin, dandruff, or the like. Further non-limiting examples of cosmetic aspects include color, density, cross-sectional area, diameter, length, porosity, combability, damage level, elasticity, frizziness, malleability, presence of static charge, retention of styling, shape, shine, smoothness, softness, stiffness, texture, volume, or the like. Manual assessment relies on the experience and availability of a trained technician. For example, while a person may feel that they are experiencing hair loss or feel that their hair is thinning, they may not know to seek advice or help from a cosmetologist. Similarly, a cosmetologist may be trained to treat hair aesthetically, but not recognize symptoms of dry scalp that result from environmental factors such as allergies, weather, or hair products. Additionally, visits to a trained cosmetologist typically occur relatively infrequently, compared to at-home hair and skin care.

Approaches to at-home care for hair and skin typically implements tele-health platforms. For example, where a visit to a cosmetologist is not available, assessment of hair and skin conditions typically proceeds by a client capturing one or more images of their hair and scalp using a smart phone and uploading the photo to be viewed by a skilled technician. The assessment therefore depends both on the quality of the photo, which may not capture information supporting identification of conditions, and on the skill of the technician to correctly identify the conditions and the correct formulas to address the conditions. Additionally, application of fluid formulas is left to the user, which presents challenges with respect to localized delivery of active ingredients. For at least this reason, liquid formulas for at-home care tend to be applied broadly to the entire scalp, rather than in a localized, precise manner. As a result, concentrations of active ingredients are reduced to avoid irritation and/or side-effects and a large proportion of the formulas are applied unnecessarily.

There is a need, therefore, for systems, devices, and techniques that perform functions of household cosmetic tools, such as combs, brushes, picks, or the like and that also interrogate hair and skin and determine user-specific cosmetic aspects of the hair and skin. In this way, the user-specific cosmetic aspects can be addressed as part of a daily hair or skin routine in a targeted way, without reliance on skilled technicians or salon visits when unavailable. Advantageously, such techniques deliver liquid formulas more effectively to precise regions, waste less formula, and simplify multiple steps into a single at-home activity that can be completed without specialized knowledge or access to experts.

In an illustrative example, a device incorporates a comb and a body, where the comb includes sensor and fluid dispensing components. The body includes electronic circuitry and a fluid dispensing assembly. The electronic circuitry controls the sensors to generate images of the scalp and hair during combing that describe the hair and skin near the comb. Image processing software on the device detects edges and/or features in the image, and recognition software classifies the edges or features as follicles, scalp, hair shafts, or the like. With the image information thus prepared, one or more quantitative parameters describing hair dimensions, hair density, scalp color, scalp temperature, or other user-specific cosmetic aspects, are developed and applied to a determination of one or more cosmetic aspects. In accordance with the determination, the device actuates the fluid dispensing assembly to deliver a fluid formula directly to the scalp using the comb.

In reference to the figures, illustrative embodiments are described, it will be appreciated that various changes can be made therein without departing from the spirit and scope of the invention. Figures illustrating configurations, structural arrangements, and internal components are intended to be non-limiting. It is understood that the systems, devices, and methods described can be implemented in multiple form factors and can include more than one device.

FIG. 1 is a schematic drawing illustrating an example diagnostic formula applicator 100, in accordance with some embodiments of the present disclosure. The example diagnostic formula applicator 100 includes a body 105 and a comb 110. The body includes hair diagnostic circuitry 115, a fluid dispensing assembly 120, and optics 125. The comb includes tines 130. Comb 110 is mechanically coupled with body 105 and can be operably coupled with body 105 to facilitate dispensing fluid formulas. To that end, comb 110 includes a first tine 130-1 including a fluid conduit 135 and a second tine 130-2 including a contact sensor 140.

In some embodiments, body 105 incorporates hair diagnostic circuitry 115, formula dispensing 120, and optics 125 in a unitary device that is enclosed in a housing 150. Housing 150 can be held and manipulated in a manner similar to that of a comb, brush, or other hair styling tool. Hair diagnostic circuitry 115 includes power supplies 150, communication circuitry 155, contact circuitry 160, non-transitory computer readable memory 170, force sensor(s) 175, motion sensor(s) 180, conductance sensor(s) 185, and processor(s) 190. The optics 125 include one or more radiation sensors 145, electrically coupled with hair diagnostic circuitry 115 and one or more radiation source(s) 147. Formula dispensing includes reservoir(s) 121 and fluid handling 123 components.

The components and circuitry illustrated in FIG. 1 permit example applicator 100 to interrogate a biological surface, such as the scalp or other skin area, during a typical usage of comb 110, as described in more detail in reference to FIG.

3. For example, contact sensor 140 is in electronic communication with contact circuit 160 and/or other hair diagnostic circuitry 115 to detect a physical contact between second tine 130-2 and the biological surface. Similarly, fluid conduit 135 is fluidly coupled with formula dispensing assembly 120, as described in more detail in reference to FIG. 2. Formula dispensing assembly 120 includes a reservoir 121 and fluid handling 123 components.

In some embodiments, operation of formula dispensing 120 and/or optics 125 is moderated by signals from contact sensor 140. Contact sensor 140 can include one or more conductive traces 141 disposed in or around an insulating or dielectric material 143, such that contact between the biological surface and the traces 141 elicits a shift in a sensor signal. In another example, contact sensor 140 can include a mechanical switch that closes a circuit when contact sensor 140 makes physical contact with the biological circuit. In this way, contact circuit 160 can receive a contact signal from contact sensor 140 as part of initiating image generation and processing, and/or fluid dispensing, as described in more detail in reference to FIG. 6.

Formula dispensing assembly 120 is operably coupled with hair diagnostic circuitry 115 to send and/or receive electronic signals as part of executing operations for providing one or more fluid formulas to the biological surface. Fluid handling 123 includes electrical, mechanical, and/or electro-mechanical parts disposed in an arrangement by which fluid formula can be conveyed from reservoir 121 to a biological surface via fluid conduit 135. For example, fluid handling 123 can include an electronically actuated valve, in electronic communication with hair diagnostic circuitry 115. The valve can control a flow of the fluid formula from fluid dispensing assembly 120 to fluid conduit 135.

While comb 110 is illustrated with one contact sensor 140 and one fluid conduit 135, comb 110 can include one or more contact sensors 140 and/or one or more fluid conduits 135. Similarly, while body 105 is illustrated with one reservoir 121, body 105 can include one or more reservoirs 121. In some embodiments, body 105 includes one reservoir 121 that is divided into compartments, as described in more detail in reference to FIG. 2.

Sensor(s) 145 can be or include visible-light cameras, ultraviolet sensors, infrared sensors, ultraviolet cameras, infrared cameras, cameras sensitive to polarized radiation, or other sensors configured to generate images using electromagnetic radiation at an energy that is not harmful to the biological surface. In an illustrative example, source(s) 147 include a source of polarized visible light having a wavelength in the range from about 380 nm to 750 nm. Source(s) 147 can also include a source of ultraviolet photons having a wavelength shorter than about 380 nm. In some embodiments, source(s) 147 include monochromatic sources, such as light emitting diodes and/or invisible sources selected to emit electromagnetic radiation that is characteristically absorbed or reflected by a cosmetic aspect of skin or hair. For example, skin conditions that manifest regions of differentiated pigmentation (e.g., dry skin, thick skin, oily skin, etc.), thermal signature (e.g., elevated blood circulation), or fluorescent compounds or structures (e.g., collagen and/or porphyrins, fungal rashes, acne blemishes, head lice, etc.) can be emphasized in images by exposing the biological surface to characteristically absorbed or reflected radiation.

For example, under ultraviolet radiation, dehydrated skin can appear purplish, while healthy skin can appear bluish. In the context of example applicator 100, the terms "purplish" and "bluish," as well as other qualitative modifiers of color terms, is used to refer to a range of wavelengths corresponding to a qualitative color sensation. For example, bluish, rather than referring to a specific wavelength of visible light, refers to a range of wavelengths from about 420 nm to about 520 nm. Purplish refers to a range of wavelengths from about 380 nm to about 460 nm.

Optics 125 can include one or more optical elements 149 that can be used to shape, form, filter, and/or steer electromagnetic radiation. For example, hair shafts can absorb visible light differentially as a function of polarization, due at least in part to the lamellar structure of hair. In this way, elements 149 can include polarization filters disposed to filter sources 147, such that the biological surface is exposed to polarized radiation. Similarly, elements 149 can include polarization filters. In the case of hair shafts, polarized visible light can emphasize the core and edges of each shaft, improving the likelihood that computer vision software can precisely detect hairs and determine dimensions and cosmetic aspects of the hair and skin. Additionally or alternatively, elements 149 can include lenses, collimators, bandpass or other wavelength selective filters, and/or wavelength selective gratings. Elements 149 can be provided to permit sensors 145 to generate focused images at a distance on the order of one centimeter to ten centimeters from the biological surface that describe regions of the biological surface at a millimeter scale. In this way, to improve precision and accuracy of image processing software, elements 149 can include lenses to correct for aberration artifacts and/or magnify images. In some embodiments, elements 149 are selected to provide a fixed focal length at a fixed magnification, corresponding to an edge of tines 130 that contact the biological surface. In this way, images can describe hair follicles, skin surface, and hair shafts at or near the follicle in focus.

Hair diagnostic circuitry 115 can include force sensor(s) 175 and motion sensor(s) 180 that provide signals used by processors 190 to determine whether to actuate fluid handling 123 and/or as a check for signals generated by contact sensor 140. Force sensor 175 can be or include an electromechanical sensor incorporating piezo-electric materials or other circuit components generating a force-dependent voltage signal. For example, capacitive or resistive circuits can register displacement or strain in a tine 130 by a force-dependent voltage signal. Similarly, motion sensor 180 can be or include an inertial measurement unit including a gyroscope, a microelectromechanical device, or other circuit configured to measure acceleration and/or sustained motion in as many as six degrees of freedom.

In some embodiments, example applicator 100 pairs with a computing device using communication circuitry 155. In an illustrative example, example applicator 100 can communicate with a smartphone, tablet, laptop, or a distributed computing system using a near-field (e.g., Bluetooth), radio (e.g., Wi-Fi), or cellular communication protocol. In this way, at least a portion of the operations described in reference to FIGS. 4-6 can be performed by the computing device. Advantageously, division of processing tasks provides increased computational resources and improves power consumption and temperature management in the example applicator 100.

Figure 2:
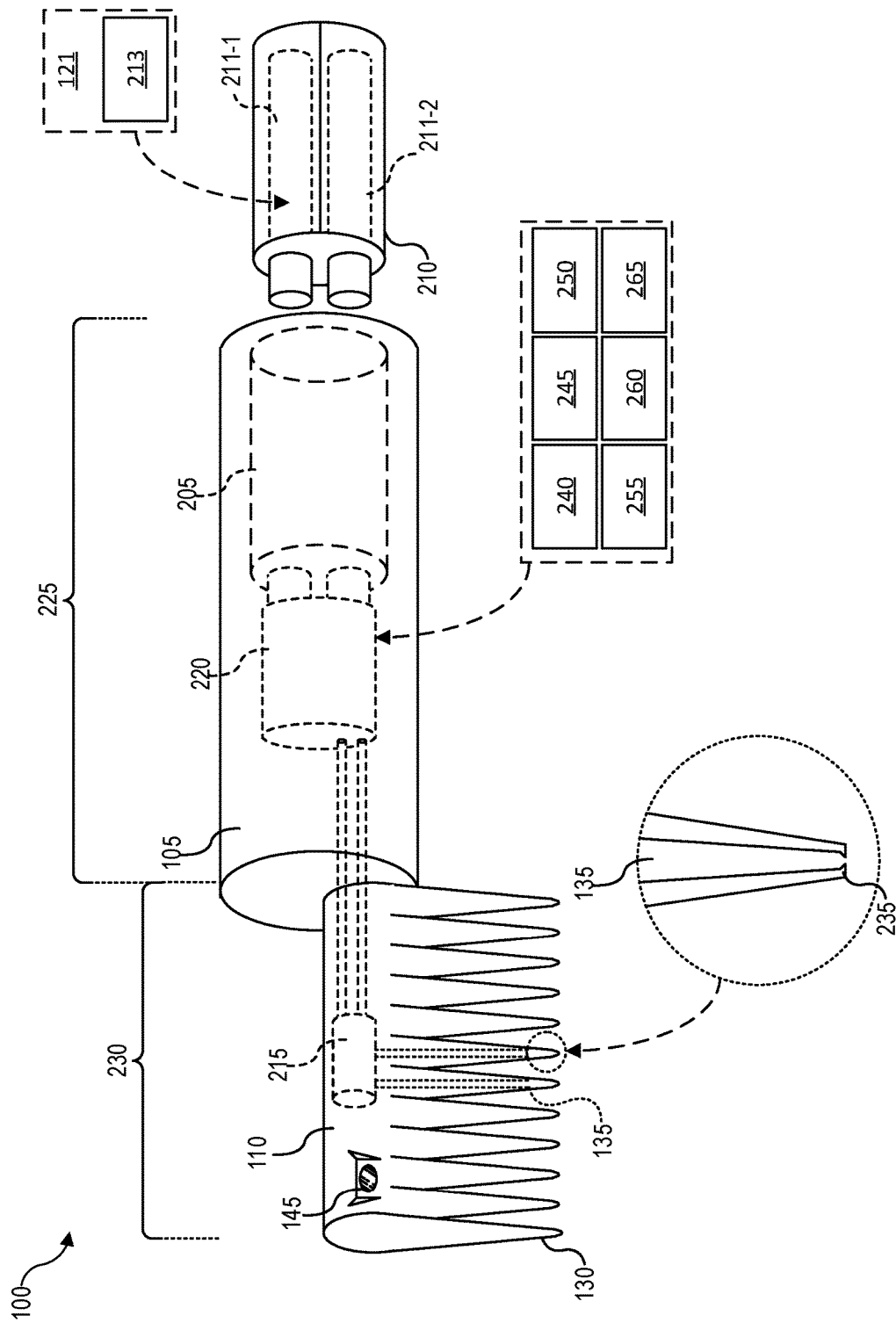
FIG. 2 is a schematic drawing illustrating the example diagnostic formula applicator including the formula dispensing assembly and radiation sensors, in accordance with some embodiments.

FIG. 2 is a schematic drawing illustrating the example diagnostic formula applicator 100 including formula dispensing assembly 120 and radiation sensors 145, in accordance with some embodiments. Formula dispensing assembly 120 includes a port 205, a cartridge 210, valve(s) 215, and fluid handling circuitry 220. In the illustrated embodiment, constituent components of body 105 and comb 110 are disposed in an arrangement such that at least a part of body 105 forms a handle 225 portion, and comb 105 including tines 130 and/or sensor(s) 145 are disposed in a head 230 portion.

As part of formula dispensing assembly 120, port 205 can include mechanical and/or electrical contacts to facilitate removeably coupling body 105 with reservoir 121. To that end, reservoir 121 can be exchangeable, for example, by being disposed within cartridge 210. Cartridge 210, in turn, can include one or more reservoirs 121 of fluid formula(s) 213 stored in compartments 211 of cartridge 210. Cartridge 210 can include identifier information, for example, encoded as an optical pattern, in a memory circuit, or through an arrangement of electrical contacts generating a characteristic signal when energized by hair diagnostic circuitry 115. The identifier information can be referenced by hair diagnostic circuitry 115 to determine the contents of cartridge 210 and cross-referenced with data stored in memory 170 to implement fluid dispensing protocols as described in more detail in reference to FIG. 6.

Through replacement of cartridge 210, example applicator 100 can be recharged or provided with new fluid formula(s) 213. In some embodiments, fluid formulas 213 include active ingredients for stimulating hair growth, for reducing hair loss, for reducing irritation, for improving one or more aesthetic features of hair or scalp, or the like. In addition to the examples previously mentioned, fluid formulas 213 can be or include topical antipruritic materials, ionic polymers, niacinamide, and/or blockers of dihydrotestosterone, such as plant-derived blockers of dihydrotestosterone. Plant-derived blockers of dihydrotestosterone include extracts of saw palmetto (*serenoa repens*), stinging nettle (*Urtica dioica*), reishi mushroom (*Ganoderma lucidum*), rosemary (*salvia rosmarinus*), or *ecklonia cava* (e.g., dieckol, a polyphenol extract of *ecklonia cava*), or the like. Aesthetic formulas can be or include pigmented polymer solutions to bind to hair shafts and impart a visible color to hair.

Fluid handling circuitry 220 includes fluid conduits and electromechanical elements 240 disposed in a circuit fluidly coupling cartridge 210 with conduit 135. Examples of electromechanical elements include piezoelectric elements to transport fluid formula 213 from cartridge 210 to valve(s) 215 and/or piezoelectric elements to induce vibration in tines 130 as part of dispensing fluid formulas 213 from conduits 135 to the biological surface. Furthermore, electromechanical components can include valve(s) 215, switches 245, or other components to facilitate selection and transport of fluid formulas 213 from cartridge 210 to conduits 135. In some embodiments, the fluid formula 213 is stored as a liquid in cartridge 210 under pressure and/or and is pressurized by fluid handling circuitry 220. In this way, the fluid formula 213 can be dispensed as a foam from conduit(s) 135. In some embodiments, to facilitate pressurization, conduit(s) 135 include a constriction 235 at or near a tip of tine 130. Where cartridge 210 stores fluid formula(s) under pressure, fluid handling circuitry 220 may omit electromechanical pumping elements 240, relying on pressure-driven flow of fluid formula(s) through valve(s) 215.

In some embodiments, formula usage is tracked over a number of uses and stored in memory 170, such that the type, quantity, and/or format of formula can be modified as part of a longitudinal approach to addressing a user-specific cosmetic aspect. For example, cartridge 210 can store an antipruritic and a moisturizing formula in separate compartments 211. Over a number of applications addressed at dry or irritated skin, example applicator 100 can dispense a decreasing proportion of antipruritic relative to moisturizing formula, making reference to data from previous usage. In this way, it is understood that fluid handling circuitry 220 can include differential blending elements 250 to dispense combinations of multiple formulas in situ. Differential blending elements can be or include switches 245, valves 255, manifolds 260, and/or electromechanical agitators 265 as part of the fluid circuit. Advantageously, such an approach also permits the dispensing of formulas that are unstable and would otherwise require manual blending or application by skilled technicians.

In this way, the fluid handling components of example applicator 100 enables the precise and localized dispensing of fluid formulas 213, actuated by electromechanical elements driven by hair diagnostic circuitry 115, in accordance with information describing one or more user-specific cosmetic aspects of a region of a biological surface.

Figure 3:
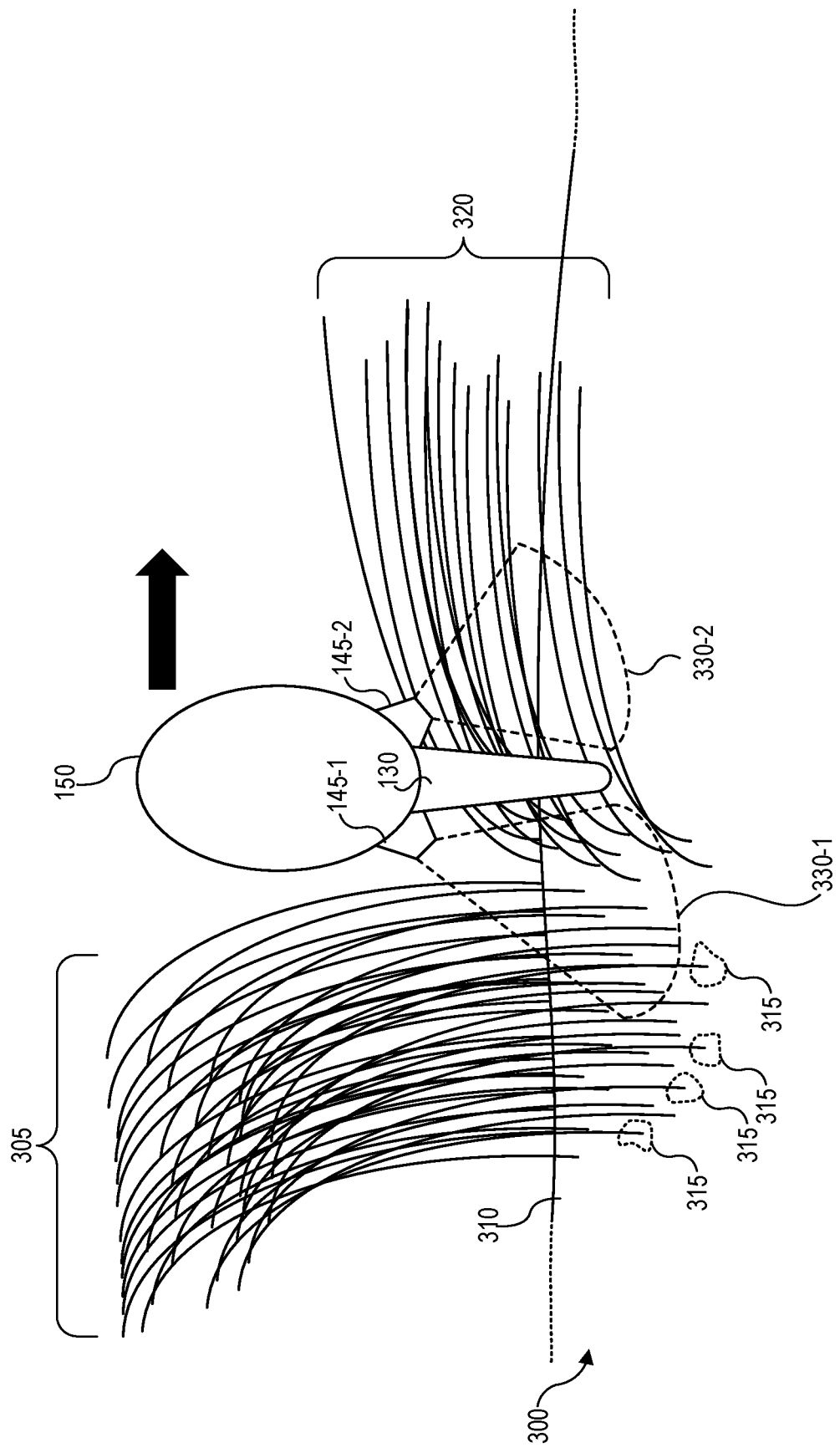
FIG. 3 is a schematic drawing illustrating the example diagnostic formula applicator during use, in accordance with some embodiments.

FIG. 3 is a schematic drawing illustrating the example diagnostic formula applicator 100 interrogating a biological surface 300, in accordance with some embodiments. Example applicator 100 is illustrated as a unitary device incorporating elements of body 105 and comb 110 in housing 150. Tines 130 of example applicator 100 are contacting biological surface 300 during usage for determining one or more user-specific cosmetic aspects of hair 305, skin 310, and hair follicles 315.

Example applicator 100 is illustrated being translated relative to biological surface 300 and locally separating a subset of hair 320, exposing skin 310 between hair 305 and subset of hair 320. Radiation sensors 145 can include a first radiation sensor 145-1 disposed in body 105 and/or comb 110 and calibrated to generate images within a first field of view 330-1 describing skin 310 and hair 305 along a part between hair 305 and subset of hair 320. Images describing first field of view 330-1 include information relevant to user-specific cosmetic aspects of hair 305 including, hair width, hair follicle 315 density, hair volume, hair thickness, hair color, and/or hair condition (e.g., damaged shafts, frizz, etc.), as described in more detail in reference to FIG. 4. Similarly, images describing first field of view 330-1 include information relevant to user-specific cosmetic aspects of skin 310 including, skin irritation, skin dryness, flaking, infection, infestation, or the like. In this way, first radiation sensor 145-1 can be calibrated to generate images in one or more spectral ranges including ultraviolet, visible, and/or infrared ranges, and can include optics to generate magnified and resolved images of the skin 310 and hair 305 near the biological surface 300.

Subset of hair 320 is deflected by tines 130 and body 105 of example applicator 100, resulting in substantial alignment in a direction parallel with the motion of example applicator 100. Substantial alignment of subset of hairs 320 can permit polarized light to emphasize hair shafts, as described previously. Advantageously, radiation sensors 145 can include a second radiation sensor 145-2 disposed to generate images describing a second field of view 330-2. Second field of view 330-2 can be configured to describe subset of hair 320, such that second radiation sensor 145-2 can be optically coupled with a polarization filter or other optical element to emphasize the interaction of subset of hair with polarized radiation. To that end, second radiation sensor 145-2 can be coordinated with a source of polarized radiation, such as radiation source 147, disposed in body 105 or comb 110 and calibrated to emit polarized radiation aligned perpendicularly to comb 105. Advantageously, substantially aligning polarized radiation with the direction of motion and subset of hair can emphasize internal lamellar structures of subset of hair 302, thereby facilitating edge detection and estimation of user-specific cosmetic aspects including hair density and/or hair dimensions.

Figure 4:
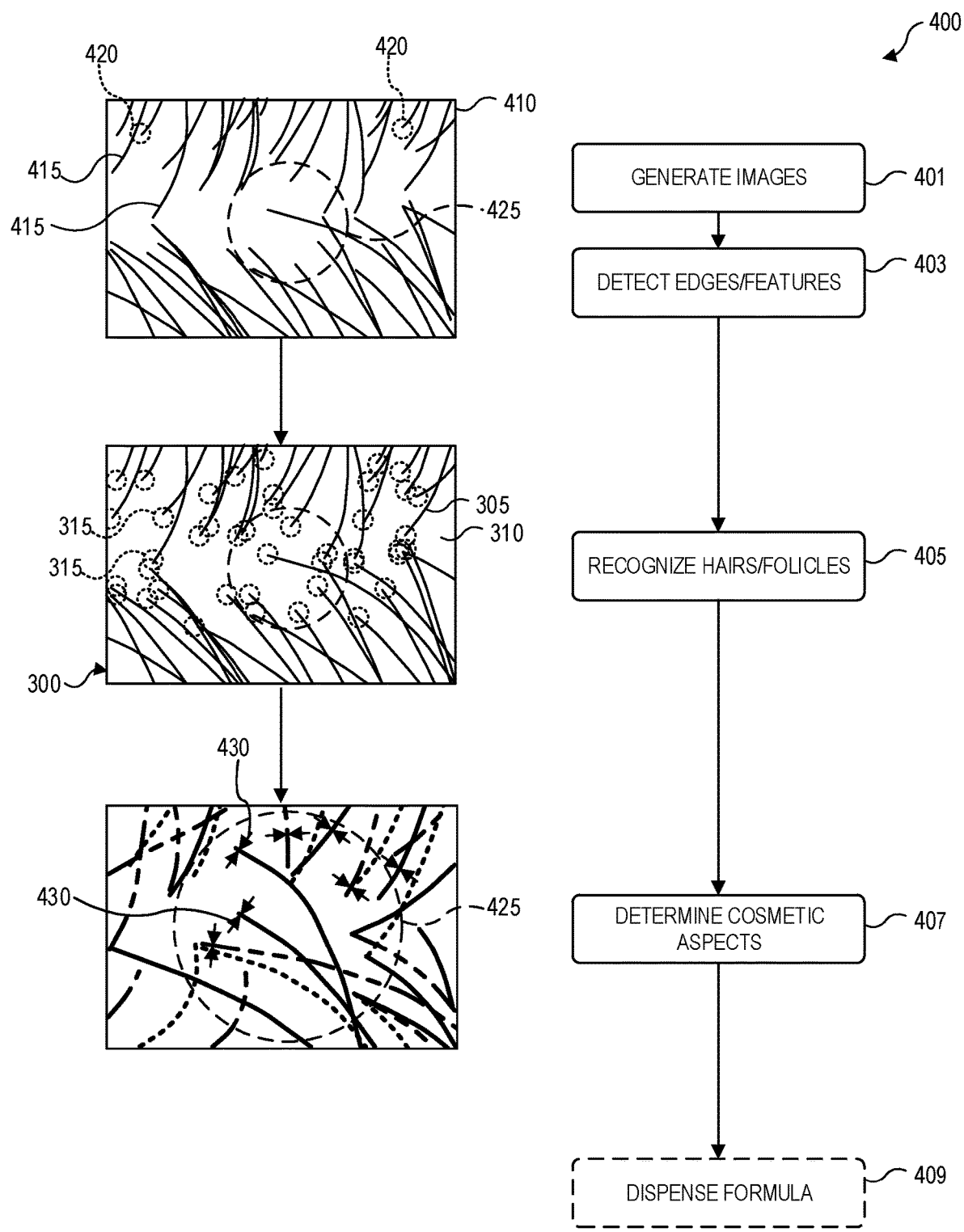
FIG. 4 is a schematic drawing illustrating an example process for determining cosmetic aspects of hair, in accordance with some embodiments.

FIG. 4 is a schematic drawing illustrating an example process 400 for determining user-specific cosmetic aspects of hair 305 and skin 310, in accordance with some embodiments. The constituent operations of example process 400 can be encoded as software in computer-readable memory and can be executed by a computing system, such as processors 190 and memory 170 of hair diagnostic circuitry 115 of FIG. 1. Example process 400 is illustrated as a series of operations 401-409, but it is understood that one or more of the operations 401-409 can be omitted, reordered, divided, or repeated. For example, in some embodiments, at least a subset of the operations 401-409 can be executed by a remote computer system (e.g., a client computing device and/or a server) in electronic communication with example applicator 100, for example, via a network or through wireless pairing. Example process 400 includes operations 401-409 for generating images 410, detecting edges and/or features in the images, recognizing hairs 305 and/or follicles 310 using the edges and/or features, determining user-specific cosmetic aspects of the biological surface 300, and dispensing formula 213.

At operation 401, the computer system generates one or more images 410 of biological surface 300 including hair 305 and skin 310. As described in more detail in reference to FIGS. 1-3, images 410 can be generated by radiation sensor(s) 145, where radiation sensor(s) 145 can include a visible light camera, an infrared camera, an ultraviolet camera, or a combination thereof, for example, a multispectral image sensor optically coupled with optical elements for defining field of view 330-1 and 330-2 and a depth of field corresponding to a position of biological surface 300. In the context of example process 400, images 410 include numerical representations (e.g., data) generated by radiation sensor(s) 145 and stored in memory 170 as image files. In some embodiments, operation 401 is contingent on receiving a signal from contact sensor 140 indicating that example applicator 100 is in contact with biological surface 300.

At operation 403, the computer system detects edges 415 and/or features 420 in images 410. In some embodiments, constituent sub-processes of operation 403 include edge detection and/or image processing techniques including applying gradient-based edge detection algorithms (e.g., Canny edge detection) and/or generating image pyramids by progressively down-sampling images 410 to differentiate low frequency information corresponding to skin 310 from high frequency information corresponding to hair 305. Similarly, feature detection can include computational approaches for determining properties or information about a region 425 of image 410 and may include feature detection and/or feature extraction techniques including, among others, gaussian based techniques, hessian based techniques, Canny, Sobel, Shi and Tomasi, FAST techniques, or combinations thereof.

In some embodiments, radiation sensor(s) 145 are calibrated such that images 410 can be used to estimate a size of region 425 of biological surface 300. Region 425 can be defined as a circular region, as illustrated, or can be defined based at least in part on one or more edges 415 and/or features 420 described by images 410. In some embodiments, region 425 is used to estimate dimensions of edges 415 and/or features 420, as part of recognition processes. In an illustrative example, radiation sensor 145 is calibrated such that each pixel in images 415 corresponds to an area of biological surface, such that region 425 describes an area of one square centimeter.

At operation 405, hair 305 and/or follicles 315 are recognized in image 410. In this context, the term "recognition" is distinguished from "detection" in that recognizing hair 305 and/or follicles 315 includes attributing identifier information to edges based on rules, heuristics, models, or other techniques. For example, hairs 305 can be recognized at least in part by applying a threshold to aspect ratio values of edges 415 in image 410. In some cases, edges 415 exhibiting a curvature below a threshold value can be attributed to hairs 305, at least in part because at relatively high magnification and near the biological surface 300, hairs 305 can be assumed to exhibit limited curvature, being anchored to skin 310 by follicles 315.

Follicles 315, by contrast, can be recognized from edge or feature detection at least in part by identifying features of skin 310 that exhibit relatively high curvature and relatively low aspect ratio. For example, follicles 315 can be relatively circular features, characterized by aspect ratios approaching unity and, as such, relatively high curvature compared to hair shafts. In some cases, terminations of hairs 305 can be recognized as follicles 315, at least in part because comb 110 is understood to part hair near biological surface 300, excluding hair ends from image 410.

In some embodiments, image segmentation can be used to identify and/or track hairs 305 in image 410. For example, hairs 305 detected by edge detection can be assigned an individual identifier value, which can be mapped to a color-space or other set of values (e.g., for visualization purposes). Each pixel of image 410 can be assigned an identifier value to either belong to a hair 305, skin 310, or follicle 315. On a pixel-wise basis recognition can also include attributing further metadata, such as coloration. For example, visible color described by image 410 can be attributed to hairs 305 from one of a set of color values. Color values can be or include encoded values corresponding to a range of hair colors. In an illustrative embodiment, a brown hair can be encoded as 0, a black hair can be encoded as 1, a white hair can be encoded as 2, a red hair can be encoded as 3, and a blonde hair can be encoded as 4.

Operation 405 can also include some data selection and/or filtration operations to reduce noise and improve accuracy of aggregate values. For example, specular reflection in image 410 can introduce noise in edges 415, such that an outlier hair 305 that is relatively wide or is foreshortened in image 410 can be removed from data for hairs 305. Similarly, hairs 305 that are uncharacteristically short can be removed, understanding that an edge detection algorithm may break a hair at a crossing, leading to a single hair being counted twice when generating distributions of hair characteristics.

At operation 407, hairs 305 and/or follicles 315 as well as edges 415 and/or features 420 at operations 403-405 are used to determine one or more user-specific cosmetic aspects of hairs 305. In some embodiments, a number of follicles within region 425 is used to estimate a density of follicles 315. The density of follicles 315, in turn, can be used to determine aggregate cosmetic aspects including hair volume, follicle health, hair density, or the like. In an illustrative example, a distance between follicles 315 in region 425 can be used to refine the estimate of follicle density (e.g., in terms of follicles 315 per square centimeter).

Individual characteristics of hairs 305 and/or follicles 315 can be used to determine user-specific cosmetic aspects of individual hairs 305, averaged over region 425. For example, characteristic width 430 of hairs 305 can be determined using edges 415, understanding that radiation sensor 145 can be calibrated for dimensional measurements at or near biological surface 300. Average characteristics of hairs 305 can be determined at least in part by determining width 430 values for multiple hairs in image 410 and determining a statistically significant value representative of mean hair thickness. In this context, hair width 430 is distinguished from hair thickness in that width 430 is a value determined directly from image 410 after edge detection and hair 305 recognition, while hair thickness is a derived value describing not only the individual hair being measured, but an average of hairs 305 outside image 410 as well. To that end, width 430 values can be determined for a sample of hairs 305 in image 410 and can be extrapolated to the population of hairs 305 recognized at operation 405.

Advantageously, determining user-specific cosmetic aspects using recognized hairs 305, rather than using edges 415 directly, reduces noise in distributions used to determine average and/or aggregate characteristics of hair 305. For example, by excluding wide hairs 305, hairs 305 for which no follicle 315 is recognized in image 410, and sampling hairs randomly, characteristic dimensions can be determined with improved precision and accuracy. Additionally, limiting estimation of width 430 to a sample of recognized hairs 305 improves computational performance and reduces power demand attributed to image processing operations. In this way, operations 401-407 can be executed.

In some embodiments, example process 400 optionally includes dispensing fluid formula 213 at operation 409. Dispensing fluid formula 213, as described in reference to FIGS. 1-2, includes actuating valve 215, fluid handling assembly 220, or other constituent component of formula dispensing 120. As described in more detail in reference to FIG. 6, determining to dispense fluid formula 213 includes temporal and spatial elements. For example, for in situ diagnostics of biological surface 300, generating and processing images occurs during the translational motion of example applicator 100. Additionally, characteristics are collected iteratively and the determination of user-specific cosmetic aspects can be repeated, mapped to regions 425 of the biological surface 300. In this way, dispensing fluid formula 213 can be localized onto precise regions of biological surface 300 with a specificity for cosmetic aspects determined for each respective region 425.

Advantageously, operation 409 can include dispensing a metered volume of fluid formula 213. In this way, the velocity of comb 110 through hair 305 can be accounted for by adjusting a rate of delivery of fluid formula 213 to biological surface. In some embodiments, the total volume to be dispensed is identified with region 425, such that for a comb 110 velocity that is relatively low or near zero, operation 409 may terminate after dispensing fluid formula 213 up to the volume. Each iteration of example process 400 can optionally terminate in a determination whether or not to dispense fluid formula 213. Across multiple iterations of example process 400, the computer system can track edges 415 and features 420 across multiple images 410 generated as example applicator 100 translates relative to biological surface 300. Edge 415 and/or feature 420 tracking reduces excess dispensing of fluid formula 213, for example, by determining user-specific cosmetic aspects using cumulative population distributions.

Figure 5:
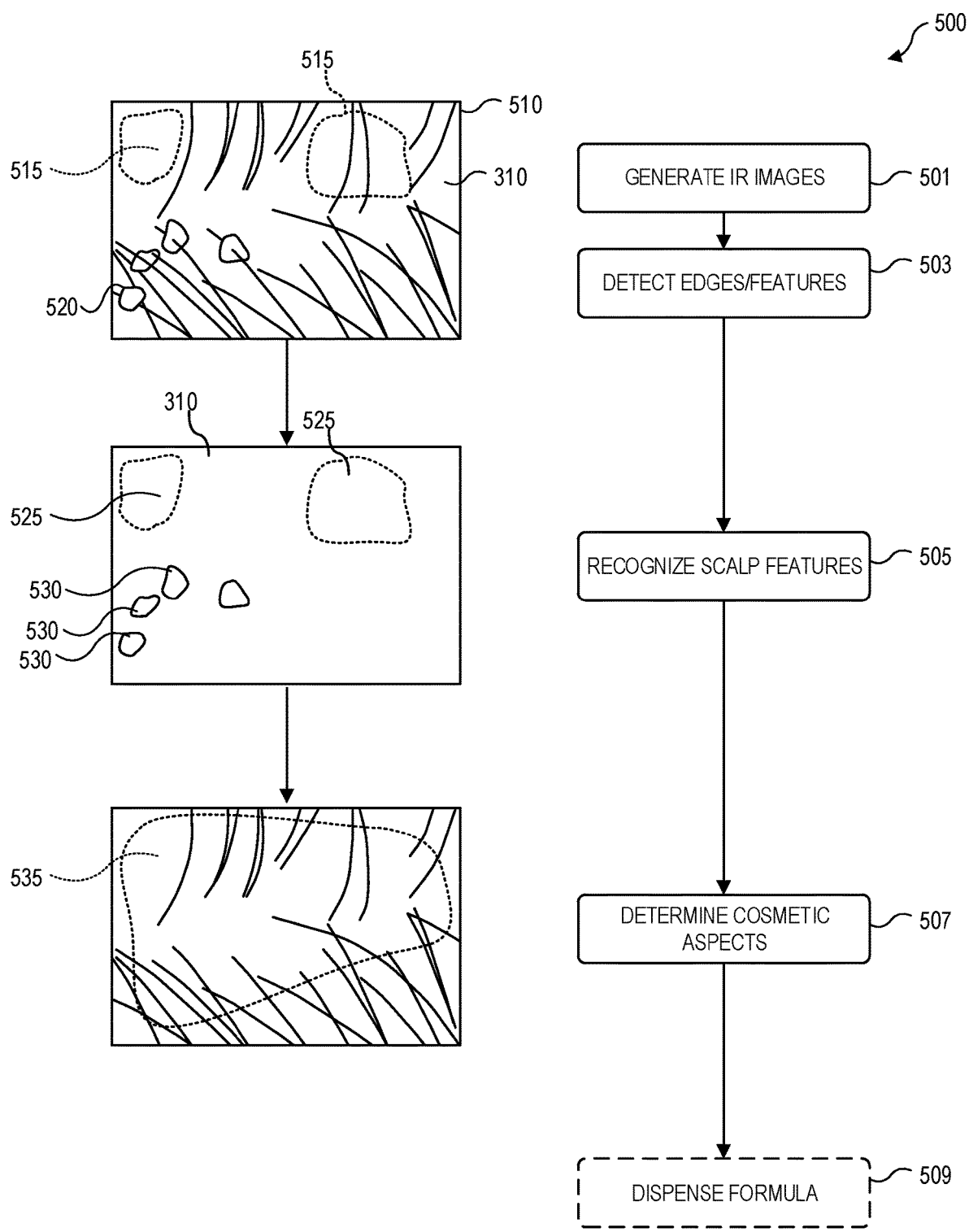
FIG. 5 is a schematic drawing illustrating an example process for determining cosmetic aspects of a scalp, in accordance with some embodiments.

FIG. 5 is a schematic drawing illustrating an example process 500 for determining user-specific cosmetic aspects of scalp 310, in accordance with some embodiments. As with example process 400, the constituent operations of example process 500 can be encoded as software in computer-readable memory and can be executed by a computing system, such as processors 190 and memory 170 of hair diagnostic circuitry 115 of FIG. 1. Example process 500 is illustrated as a series of operations 501-509, but it is understood that one or more of the operations 501-509 can be omitted, reordered, or divided. For example, in some embodiments, at least a subset of the operations 501-509 can be executed by a remote computer system (e.g., a client computing device and/or a server) in electronic communication with example applicator 100, for example, via a network or through wireless pairing. Example process 500 includes operations 501-509 for generating images 510, detecting edges and/or features in the images, recognizing one or more regions of irritated skin 525, skin flakes 530, or other skin features, using the edges and/or features, determining user-specific cosmetic aspects of skin 310, and dispensing fluid formula(s) 213. Additionally, operations 501-509 can be implemented in parallel with example process 400 or by omitting at least a subset of operations 501-509 when image 510 and image 410 are generated by the same operation.

At operation 501, the computer system generates image 510 describing skin 310. As described in more detail in reference to FIG. 4, image 510 can be generated using radiation sensor(s) 145. Image 510 can include spectral information that emphasizes or reveals skin conditions, as described in more detail in reference to FIGS. 1-2. For example, infrared and/or ultraviolet radiation can be collected by radiation sensor(s) 145 and used to generate image 510. In some embodiments, image 510 is filtered to remove high-frequency information, such as hairs 305, specular reflection, or other fine features that are more likely to describe hair 305 than to describe skin 510.

At operation 503, features 515 of skin 310 are detected. In some embodiments, edges 520 are also detected. In some embodiments, skin irritation 525, skin flakes 530, or other user-specific cosmetic aspect of skin 310 can manifest as a localized change in surface temperature that is detectable in thermal imaging. Identification and recognition of skin features 515 and edges 520 can thus be facilitated by including infrared information in image 510. For example, skin flakes 530 can occlude skin 310 in image 510, which can be detectable as a locally reduced temperature.

At operation 505, edges 515 and features 520 of image 510, including infrared information, are recognized as regions of irritated skin 525 and skin flakes 530. As described in reference to hair 305 in FIG. 4, recognition can include identifying regions characterized by relatively elevated temperature, or by visible coloration that is uncharacteristic of hair 305 or skin 310. Similarly, regions including skin flakes 530 can be identified by edges and/or shapes characteristic of skin flakes.

At operation 507, user-specific cosmetic aspects of skin 310 are determined. In some embodiments, cosmetic aspects of skin 310 include, among others, skin health, irritation, dryness, or dandruff. Indications of each respective cosmetic aspect can be identified with recognized scalp features determined at operation 505. For example, a combination of skin flakes 530 and irritated skin 525 can be attributed to a region of dry skin 535 in image 510. The region of dry skin 535 can be compared to a threshold or a reference value for dispensing fluid formula 213 addressed at dry skin, such as an antipruritic and/or a moisturizer. The threshold or reference value can describe a value for an estimated maximum temperature within region of dry skin 535. In this way if the estimated maximum temperature within region of skin 535 meets or exceeds the threshold, fluid formula 213 will be dispensed at optional operation 509.

As described in more detail in reference to FIG. 4, dispensing fluid formula 213 can be localized to a precise region on biological surface 300 by referencing the position of comb 110 relative to biological surface, using features detected during example operation 500. For example process 500 can be repeated and edges 520 and/or features 515 can be tracked over time. The tracking can be used with motion data to improve precision and/or metering of fluid formula(s) 213.

Figure 6:
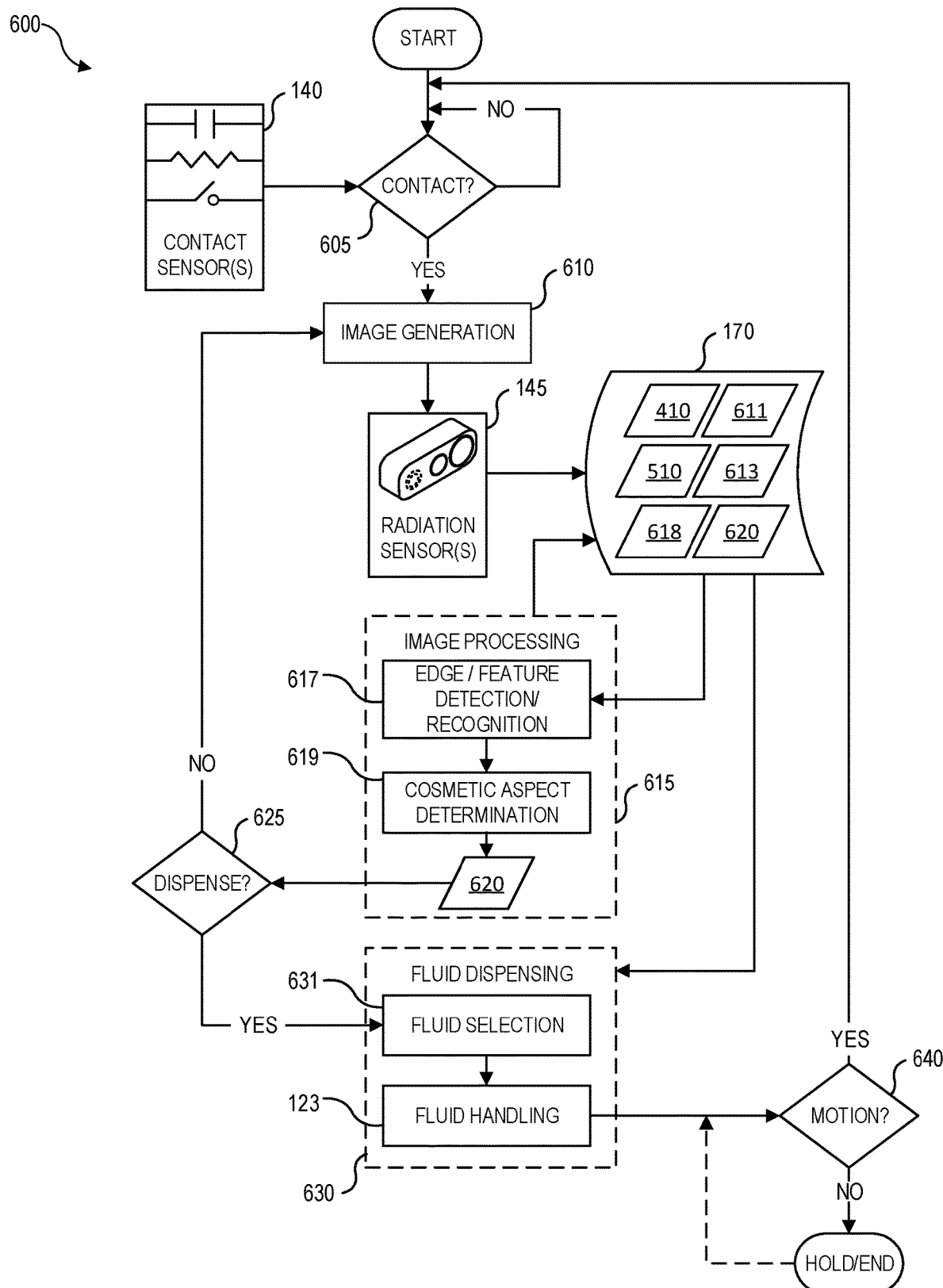
FIG. 6 is a block diagram illustrating an example data flow for a diagnostic formula applicator, in accordance with some embodiments.

FIG. 6 is a block diagram illustrating an example data flow 600 for a diagnostic formula applicator, in accordance with some embodiments. As with example processes 400 and 500, the constituent operations of example data flow 600 can be encoded as software in computer-readable memory and can be executed by a computing system, such as processors 190 and memory 170 of hair diagnostic circuitry 115 of FIG. 1. Example data flow 600 is illustrated as a series of process blocks and decision blocks, but it is understood that one or more of the processes and decisions can be omitted, reordered, divided, or repeated. For example, in some embodiments, at least a subset of the process and/or decision operations can be executed by a remote computer system (e.g., a client computing device and/or a server) in electronic communication with example applicator 100, for example, via a network or through wireless pairing. Example data flow 600 includes processes and decisions for determining contact 605 with biological surface 300, generating images 610, image processing 615, determining to dispense 625 fluid formula 213, and fluid dispensing 630.

At decision block 605, the computer system determines whether comb 110 is in contact with biological surface 300. The computer system can receive a contact signal from contact sensor(s) 140 and can include contact circuitry 160 to process contact signal and determine a binary value (e.g., true or false) describing whether to initiate image generation 610 and other processes of example data flow 600. Advantageously, including decision block 605 can improve system performance by predicating computational resource usage for image processing 615 on comb 110 being in position to dispense fluid formula 213. Furthermore, where radiation sensor(s) 145 are calibrated and provided with optics such that images describe the near surface region of biological surface 300, including decision block 605 improves efficiency and performance of image processing 615 by initiating image generation 610 when radiation sensor(s) 145 are in position relative to biological surface 300 to generate meaningful surface information.

At process block 610, the computer system initiates image generation 610. As described in more detail in reference to FIGS. 1-3, image generation 610 includes activating radiation sensor(s) 145 to generate one or more images 410 of biological surface 300 including hair 305 and skin 310. Images 410 and 510 can be stored in memory 170 to be used, with other data 611 and 613 in image processing 615. For example, memory 170 can store cosmetic aspect metadata 611 and fluid formula metadata 613 for use during image processing 615 and/or fluid dispensing 630. For example, cosmetic aspect metadata 611 can include characteristic information permitting the computer system to recognize hair 305, skin 310, and/or hair follicles 315, and permitting the computer system to determine user-specific cosmetic aspects, as described in more detail in reference to FIGS. 3-5. Similarly, fluid formula metadata 613 can describe fluid formula 213 currently available to dispense, as, for example, may be retained in compartment(s) 211 of cartridge 210 being loaded in port 205. In some embodiments, fluid formula metadata 613 and cosmetic aspect metadata 611 are cross-referenced in memory 170, for example, by including lookup tables of formula selections and metering/volume values that relate cosmetic aspects to specific fluid formulas 213. Conversely, computer system can initiate specific image processing 615 operations based at least in part on identifier information stored in fluid formula metadata 613. For example, where cartridge 210 stores a topical antihypertensive vasodilator and a pigment or dye in separate compartments 211, image processing 615 can execute operations for determining follicle 315 density and hair coloration, and can omit operations for assessing user-specific cosmetic aspects of skin 310. Similarly, where cartridge 210 stores an antipruritic or a skin moisturizer, image processing 615 can execute operations for determining skin 310 condition, and can omit operations for assessing cosmetic aspects of hair 305. In some embodiments, example applicator 100 stores fluid formulas 213 for multiple hair 305 aspects and skin 310 aspects, such that image processing 615 includes determination of multiple cosmetic aspects of both hair 305 and skin 310.

At process block 617, the computer system detects edges 415 and features 420 in images 410 and/or edges 520 and features 515 in images 510, using edge and/or feature detection techniques as described in more detail in reference to FIGS. 4-5. Edges and features detected at block 617 can be identified with metadata and stored in memory 170 as part of feature tracking operations. Recognition of features, shown as part of process block 617 can be implemented to improve precision and accuracy of cosmetic aspect determination 619, for example, by excluding outliers, noisy data, and/or filtering or segmenting images 410 and 510 when generating aggregate or average aspects to avoid biasing population distributions.

At process block 619, the computer system determines user-specific cosmetic aspects of skin 310 and/or hair 305 using edges and/or features detected and/or recognized in images 410 and 510. As described in more detail in reference to FIGS. 3-5, determination of cosmetic aspects can include measurement of dimensions of individual hairs 305 to derive population averages, comparing calculated values to thresholds or reference values, such as average temperature in a region of skin or follicle density per square centimeter, or identifying the presence of particular conditions, such as irritation, infestation, or infection. An output of process block 619 is cosmetic aspect data 620 describing one or more cosmetic aspects of biological surface 300.

Cosmetic aspect data 620 can be stored in memory 170 and can be referenced to a position of example applicator 100 relative to biological surface 300. In some embodiments, example applicator 100 maps cosmetic aspect data 620 to a map of biological surface 300 using visual simultaneous localization and mapping techniques. For example, by generating a series of images according to a prescribed motion and orientation procedure, a map of features can be generated on a larger scale, before determining cosmetic aspects at the scale described in reference to FIGS. 2-5. In an illustrative example, biological surface 300 describes a portion of the scalp, face, head, and neck of a human use of example applicator 100. In this example, mapping operations can include identifying a quadrant of the head, proceeding to scan radiation sensor(s) 140 over the quadrant in a raster pattern, and combining motion data generated by motion sensor 180 with image data generated by radiation sensors 140 to generate a map of features referenced to positions in the quadrant. Advantageously, such mapping operations can facilitate repeated dispensing of fluid formula 213 to precise locations over time, including repeating cosmetic aspect determination as part of adapting fluid dispensing 630 to changes in condition of biological surface 300.

At decision block 625, the computer system determines whether to dispense fluid formula 213 using cosmetic aspect data 620. The determination can include comparing cosmetic aspect data 620 to threshold or reference values 618, for example, where a cosmetic aspect describes an aggregate or population average, a derived value, or other continuous parameter. For example, dispensing a hair volumizing polymer solution that increases apparent hair thickness upon drying on hair 305 can be determined based on estimated hair volume below a threshold. Additionally or alternatively, the determination can include a binary decision when cosmetic aspect data describes a binary value. For example, dispensing an antipruritic and/or moisturizer can be determined by the determination that a region of skin 310 is irritated. Comparison to a reference value can include a determination that the user-specific cosmetic aspect differs from the reference value. For example, computer system can determine to deliver fluid formula to a region of a biological surface if a user-specific hair cosmetic aspect differs from a reference combability measure, a reference damage measure, a reference elasticity measure, a reference frizziness measure, a reference malleability measure, a reference static charge measure, a reference retention of styling measure, a reference smoothness measure, a reference softness measure, or a reference stiffness measure. In some embodiments, fluid formula(s) 213 can be dispensed satisfies (meets or exceeds) a threshold and/or or user specific hair volume, a user-specific hair thickness, a user-specific hair follicle density, or a user-specific hair temperature. In this context, the term "user-specific" refers to values that are pre-defined, determined, or adapted based on the specific user of the computer system. For example, diagnostic formula applicator 100 can be used to implement a routine to address a user-specific cosmetic aspect that can be related to hair and/or skin. The fluid dispensing determination, therefore, can be made at least in part based on whether the user-specific cosmetic aspect is substantially equal or approaching a target value or differs appreciably from the target value. The dispensing determination at decision block 625 can be responsive to an extent of the difference between the user-specific cosmetic aspect and the threshold, reference, or user-specific values. In this context, the term "responsive" indicates that the determination can be non-binary, such that dispensing can be proportional to a magnitude of the user-specific cosmetic aspect. As an example, fluid formulas 213 composed to reduce frizz and static can be dispensed more readily or in larger volumes in response to frizz that is further from a reference value, threshold, or user-specific value. Similarly, topical antipruritic formulas can be applied in smaller volumes or concentrations in response to skin irritation being less severe or more severe than a reference level.

At process block 631, the computer system selects one or more fluid formulas 213 for dispensing. As described in more detail in reference to FIG. 2, fluid selection at block 631 can include generating control signals by hair diagnostic circuitry 115 that instruct fluid handling 123 open one or more electromechanical components permitting and/or causing fluid formula(s) 213 to flow from cartridge 210 or reservoir 121. Selection can be limited to a determination made by computing circuitry 115 or can include generating signals sent to fluid handling 213 components.

At process block 123, the computer system actuates fluid transport components 220 of example applicator 100, corresponding to control signals indicating the type and quantity of fluid formula(s) 213 to dispense. As described in more detail in reference to FIGS. 3-5, fluid dispensing 630 is location specific, and can be implemented in situ with other operations illustrated as part of example data flow 600. For example, while processing time for each constituent operation can introduce a latency between decision block 605 and fluid dispensing 630, the latency can be short enough that fluid formula(s) 213 can be precisely dispensed to biological surface 300 at the position corresponding to the cosmetic aspects determined during image processing 615. In some embodiments, where latency affects precise dispensing, the computer system can reference motion data to generate an indication, notification, or other prompt to the user of example applicator 100 to reduce the speed of motion of comb 110 relative to biological surface. In some embodiments, the indication, notification, or prompt can be or include haptic feedback, visual indications, and/or audio feedback that individually or collectively cue the user to move more slowly.

At decision block 640, the computer system references motion data generated by motion sensor 180 to determine whether to repeat operations of example data flow 600. While motion is below a threshold value or near-zero, computational resources can be preserved by pausing or holding sensor, image, and fluid dispensing operations until motion is detected. In this way, where motion data indicates a period of time has elapsed with no motion of example applicator 100, the computer system can terminate operations and deactivate the various components of example applicator 100.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The embodiments of the invention in which an exclusive property or privilege is claimed are defined as follows:

1. A diagnostic formula applicator, comprising:
a fluid dispensing assembly coupled with a comb having a plurality of tines, wherein a tine of the plurality of tines is configured to dispense a fluid formula to a region of a biological surface, via at least one fluid conduit; and
hair diagnostic circuitry operably coupled to the fluid dispensing assembly, the diagnostic circuitry configured to actuate the fluid dispensing assembly to deliver the fluid formula via the at least one fluid conduit, responsive to determining a user-specific hair cosmetic aspect from hair and scalp sensor information, wherein the hair diagnostic circuitry is operably coupled with a radiation sensor, and
the diagnostic formula applicator further comprising one or more non-transitory memory devices storing computer-readable instructions that, when executed by the hair diagnostic circuitry, cause the hair diagnostic circuitry to perform operations comprising:
generating an image of the region of the biological surface using the radiation sensor, the region comprising skin, hairs, and hair follicles;
attributing the user-specific hair cosmetic aspect to the region of the biological surface using the image; and
dispensing the fluid formula to the region via the conduit using the fluid dispensing assembly, based at least in part on the one or more cosmetic aspects.

2. The diagnostic formula applicator of claim 1, wherein the hair diagnostic circuitry is configured to actuate the fluid dispensing assembly to deliver the fluid formula responsive to a determination that the user-specific hair cosmetic aspect satisfies a threshold hair volume, a threshold hair thickness, a threshold hair follicle density, or a threshold hair temperature.

3. The diagnostic formula applicator of claim 1, wherein the hair (original) diagnostic circuitry is configured to actuate the fluid dispensing assembly to deliver the fluid formula responsive to a determination that the user-specific hair cosmetic aspect satisfies a user-specific hair volume, a user-specific hair thickness, a user-specific hair follicle density, or a user-specific hair temperature.

4. The diagnostic formula applicator of claim 1, wherein the hair diagnostic circuitry is configured to actuate the fluid dispensing assembly to deliver the fluid formula responsive to a determination that the user-specific hair cosmetic aspect differs from a reference combability measure, a reference damage measure, a reference elasticity measure, a reference frizziness measure, a reference malleability measure, a reference static charge measure, a reference retention of styling measure, a reference smoothness measure, a reference softness measure, or a reference stiffness measure.

5. The diagnostic formula applicator of claim 1, wherein the hair diagnostic circuitry is configured to actuate the fluid dispensing assembly to deliver the fluid formula responsive to a determination that the user-specific hair cosmetic aspect meets or exceeds a threshold shape, a threshold shine, a threshold texture, or a threshold volume.

6. The diagnostic formula applicator of claim 1, wherein the hair and scalp sensor information comprises images of the region of the biological surface.

7. The diagnostic formula applicator of claim 1, wherein the comb further comprises a contact sensor in electronic communication with the hair diagnostic circuitry, the contact sensor configured to detect a physical contact between the tine and the biological surface.

8. The diagnostic formula applicator of claim 1, wherein the tine is a (original) first tine, wherein the conduit is a first conduit, and wherein a second tine of the plurality of tines comprises a second conduit fluidly coupled with the fluid dispensing assembly.

9. The diagnostic formula applicator of claim 1, further comprising a radiation source, electronically coupled with the hair diagnostic circuitry.

10. The diagnostic formula applicator of claim 9, wherein the radiation source comprises a source of polarized radiation.

11. The diagnostic formula applicator of claim 1, further comprising a fluid reservoir, wherein the fluid dispensing assembly comprises a port configured to removeably couple with the fluid reservoir.

12. The diagnostic formula applicator of claim 11, wherein the fluid reservoir comprises a compartment containing a topical antihypertensive vasodilator.

13. The diagnostic formula applicator of claim 11, wherein the fluid reservoir comprises a compartment containing a topical antipruritic.

14. The diagnostic formula applicator of claim 11, wherein the fluid reservoir comprises a compartment containing a cosmetic formula.

15. The diagnostic formula applicator of claim 1, wherein the fluid dispensing assembly comprises an electronically actuated valve, in electronic communication with the hair diagnostic circuitry, the valve controlling a flow of a fluid formula from the fluid dispensing assembly to the conduit.

16. The diagnostic formula applicator of claim 1, wherein the radiation sensor comprises a polarized-light camera or an infrared camera.

17. The diagnostic formula applicator of claim 1, wherein attributing the user-specific hair cosmetic aspect to the region of the biological surface comprises:
detecting one or more edges in the image, the edges defining the hairs and the hair follicles; and
estimating a characteristic width of the hairs in the image using the edges;
estimating a number of hair follicles in the region using the edges;
determining a size of the region using the image;
determining a hair volume using the number of hair follicles and the size; or
determining a hair thickness using the characteristic width.

18. The diagnostic formula applicator of claim 1, wherein dispensing the fluid formula comprises:
receiving a signal from a contact sensor, electronically coupled with the hair diagnostic circuitry, the signal indicating a physical contact between the tine and the biological surface; and
actuating an electronically actuated valve, electronically coupled with the hair diagnostic circuitry, the valve controlling a flow of the fluid formula from the fluid dispensing assembly to the conduit.

* * * * *

UNITED STATES PATENT AND TRADEMARK OFFICE
CERTIFICATE OF CORRECTION

| | | |
|---|---|---|
| PATENT NO. | : 12,108,858 B2 | Page 1 of 1 |
| APPLICATION NO. | : 17/491025 | |
| DATED | : October 8, 2024 | |
| INVENTOR(S) | : Dominic Akerele et al. | |

It is certified that error appears in the above-identified patent and that said Letters Patent is hereby corrected as shown below:

In the Claims

| Column | Line | |
|---|---|---|
| 17 | 19 | Claim 1, delete "sensor, and" and insert -- sensor; and -- |
| 17 | 41 | Claim 3, delete "hair (original) diagnostic" and insert -- hair diagnostic -- |
| 18 | 7 | Claim 8, delete "is a (original) first tine," and insert -- is a first tine, -- |
| 18 | 44 | Claim 17, delete "follicles; and" and insert -- follicles; -- |

Signed and Sealed this
Sixth Day of January, 2026

John A. Squires
*Director of the United States Patent and Trademark Office*